United States Patent [19]

Gaiser

[11] Patent Number: 4,483,790
[45] Date of Patent: Nov. 20, 1984

[54] METHOD OF DISPOSING OF SHUT-DOWN NUCLEAR POWER PLANTS

[75] Inventor: Herbert Gaiser, Munich, Fed. Rep. of Germany

[73] Assignee: Alfred Kunz & Co., Munich, Fed. Rep. of Germany

[21] Appl. No.: 333,612

[22] Filed: Dec. 22, 1981

Related U.S. Application Data

[63] Continuation of Ser. No. 24,046, Mar. 26, 1979, abandoned.

[30] Foreign Application Priority Data

Dec. 15, 1978 [DE] Fed. Rep. of Germany ....... 3854330

[51] Int. Cl.$^3$ .......................... G21F 9/34; G21C 13/00
[52] U.S. Cl. .................................... 252/633; 252/626; 376/272; 376/273; 376/274; 405/128
[58] Field of Search ....................... 252/626, 628, 633; 376/273, 274, 264, 272, 463, 911, 280; 52/742, 745; 405/128, 267

[56] References Cited

U.S. PATENT DOCUMENTS

| | | | |
|---|---|---|---|
| 2,773,459 | 12/1956 | Sechy | 376/289 |
| 2,983,659 | 5/1961 | Treshow | 176/87 |
| 3,108,439 | 10/1963 | Reynolds | 376/273 |
| 3,115,194 | 12/1963 | Adams | 376/273 |
| 3,214,343 | 10/1965 | Natland | 176/39 |
| 3,755,079 | 8/1973 | Weinstein et al. | 376/273 |
| 4,009,579 | 3/1977 | Patzner | 61/42 |
| 4,146,429 | 3/1979 | Slagley | 176/38 |
| 4,283,890 | 8/1981 | Takeda et al. | 52/745 |

FOREIGN PATENT DOCUMENTS

| | | |
|---|---|---|
| 1154578 | 9/1963 | Fed. Rep. of Germany ... 176/DIG. 4 |
| 2342887 | 3/1975 | Fed. Rep. of Germany . |
| 2405821 | 8/1975 | Fed. Rep. of Germany . |
| 2710290 | 9/1978 | Fed. Rep. of Germany ...... 376/274 |
| 2854330 | 6/1980 | Fed. Rep. of Germany . |
| 955217 | 1/1950 | France . |
| 1429685 | 5/1973 | United Kingdom ................ 376/273 |
| 1403033 | 8/1975 | United Kingdom ................ 405/138 |
| 0624989 | 8/1978 | U.S.S.R. ................................ 176/38 |

OTHER PUBLICATIONS

Marks' Standard Handbook for Mechanical Engineers, 7th Edition, (McGraw-Hill), pp. 29-31, vol. 12.
Webster's New Collegiate Dictionary, (G&C Merriam Co., 1977) at p. 155.

*Primary Examiner*—Benjamin R. Padgett
*Assistant Examiner*—Howard J. Locker
*Attorney, Agent, or Firm*—Fleit, Jacobson, Cohn & Price

[57] ABSTRACT

A shut-down atomic power plant or a section thereof, particularly the nuclear reactor, is disposed of by sinking it to below ground level by constructing a caisson with cutting edges from the foundations of said plant or section or by excavating a pit therebelow.

1 Claim, 5 Drawing Figures

METHOD OF DISPOSING OF SHUT-DOWN NUCLEAR POWER PLANTS

This is a continuation of application Ser. No. 24,046 filed Mar. 26, 1979, (now abandoned).

FIELD OF THE INVENTION

The invention relates to a method of disposing of shut-down nuclear power plants in which parts that are not radioactivity contaminated are demolished.

BACKGROUND OF THE INVENTION

By reason of the rapid development of new and improved nuclear power plant types, it becomes increasingly necessary to dispose of previously-built experimental reactors and out-of-date nuclear power plants. A particular problem in disposing of nuclear power plants and nuclear reactors arises out of the fact that the reactor parts contain radioactive material and particularly radioactively contaminated water which must not escape during the demolishing nor endanger the people performing the demolishing. When sawing up the reactor part or demolishing it in some other way for disposal, catching the radio-actively contamnated water and protecting the surroundings from the radioactive material constitutes a practically insoluble problem.

SUMMARY OF THE INVENTION

The present invention relates to a method of safely disposing of shut-down nuclear power plants or parts.

In a preferred embodiment of the method, a shut-down atomic power plant or a section thereof, particularly the nuclear reactor, is disposed of by lowering it to below ground level by constructing a caisson with cutting edges from the foundations of the plant or section or by excavating a pit therebelow.

It is therefore an object of the present invention to provide a method for disposing of shut-down nuclear power plants that is certain to eliminate endangering of the environment as well as the break-down crew with radioactive radiation.

Other objects and advantages of the invention will become apparent from a reading of the detailed description and the drawings relating thereto.

DETAILED DESCRIPTION OF THE DRAWINGS

Figure 1:
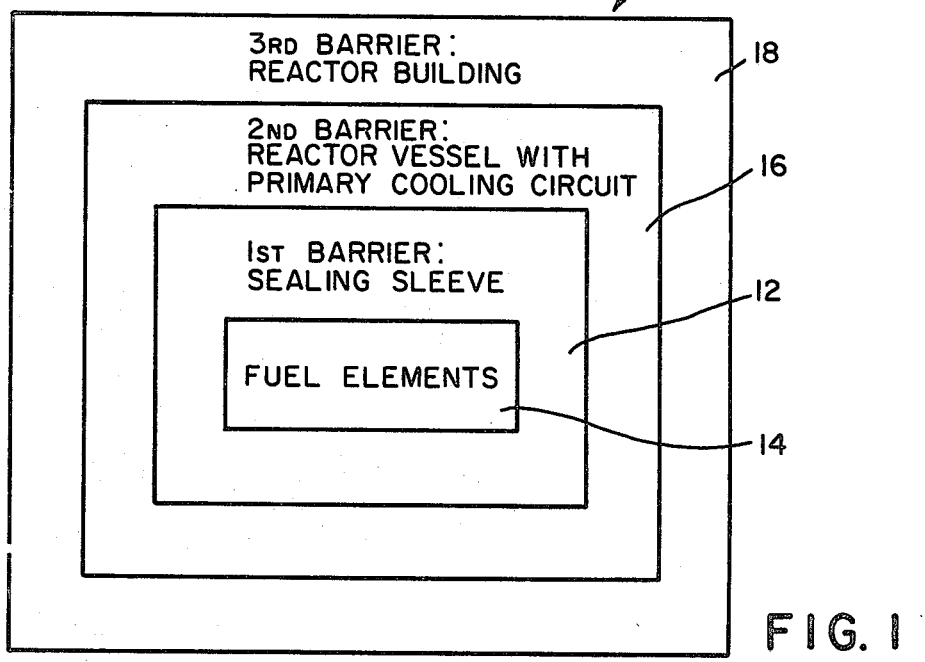
FIG. 1 is a block diagram schematically illustrating the elements of a nuclear reactor.
Figure 2:
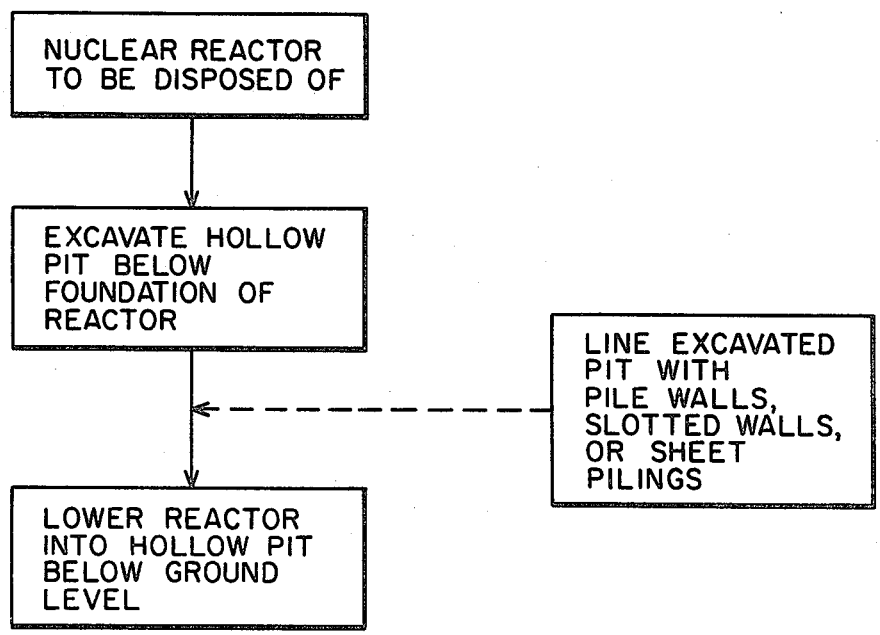
FIG. 2 is a block diagram illustrating a preferred embodiment of the method of the present invention.

According to the invention, this object of safely disposing of shut-down nuclear power plants is achieved in a method of the aforementioned kind in that at least the reactor part is lowered to below ground level. With reference to FIG. 1, the invention is based on the consideration that in a nuclear reactor 10, the radioactive material is protected by at least three barriers. The first barrier is formed by the sealing sleeve 12 for the fuel elements 14, the second barrier (sometimes referred to as a reactor part) is formed by the reactor vessel 16 or pipe conduits of the primary cooling circuit and the third barrier is found by the reactor building 18 which houses everything. As shown in FIG. 2 certain protection from radioactive radiation in the disposal of nuclear power plants is achieved by sinking the reactor building with all the equipment that is contained in it. Of course it is also possible to sink only the reactor part 16 in which the radioactive material is safely encapsulated. If necessary, the reactor part can in addition be provided with sealing and radiation protecting substances before it is sunk so that it is additionally protected. If the reactor part is sunk by itself without the building that surrounds it, its foundation or base plate is separated from the surrounding parts of the building. The latter can then be demolished by conventional means.

Lowering or sinking of the nuclear power plant building or at least the reactor part can be effected by various means, some of which are already known.

Figure 3:
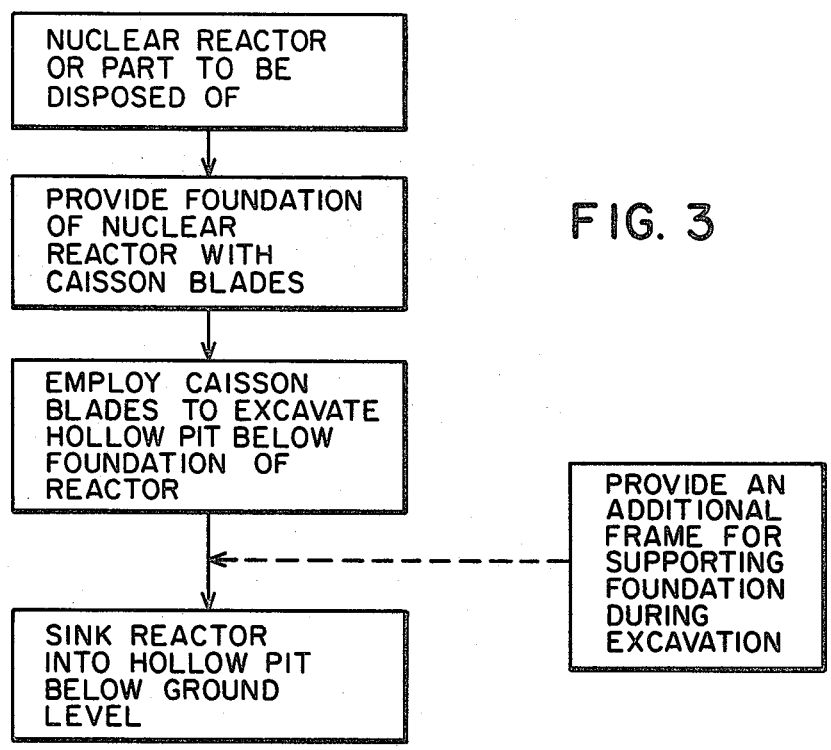
FIG. 3 is a block diagram useful in explaining the use of caisson blades for practicing the method of the present invention.

As shown in FIG. 3, according to one advantageous embodiment, the foundation of the nuclear power plant part 10 or reactor part 16 is provided with caisson blades and the caisson thus formed is sunk. The caisson blades or cutting edges can be applied to the foundation plate by way of underground working. If necessary, an additional frame may be provided for supporting the foundation when constructing the box to be sunk.

Figure 4:
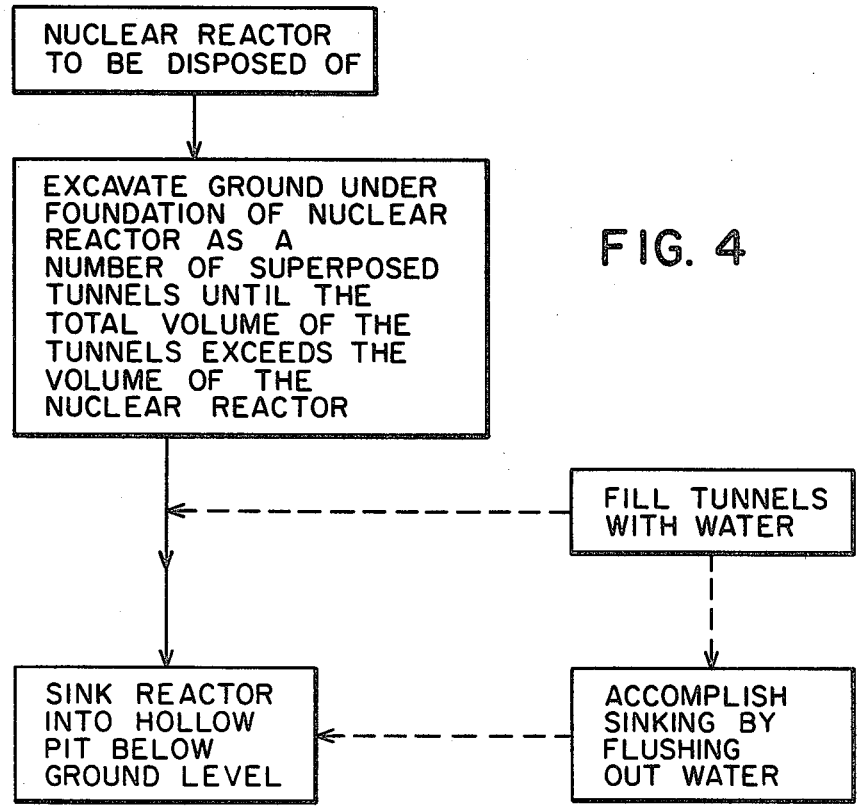
FIG. 4 is a block diagram illustrating another embodiment of the method of the present invention.

With reference to FIG. 4 the pit into which the nuclear power plant part or reactor part is sunk can also be produced in that the ground under the foundation of the nuclear power plant part or reactor part is excavated in superposed planes by tunnels of which the total volume exceeds the part to be sunk. After sinking of the nuclear part, the walls of the tunnels are blasted.

To facilitate gentle and uniform lowering, it may be desirable to fill the tunnels with water, other fluids or sand which is subsequently flushed out.

Desirably, the ground receiving the reactor part or nuclear power plant part is bounded by side walls to create a pit. To bound such a pit one can for example provide uncased pile walls, slotted walls or sheet pilings as shown in FIG. 2.

Figure 5:
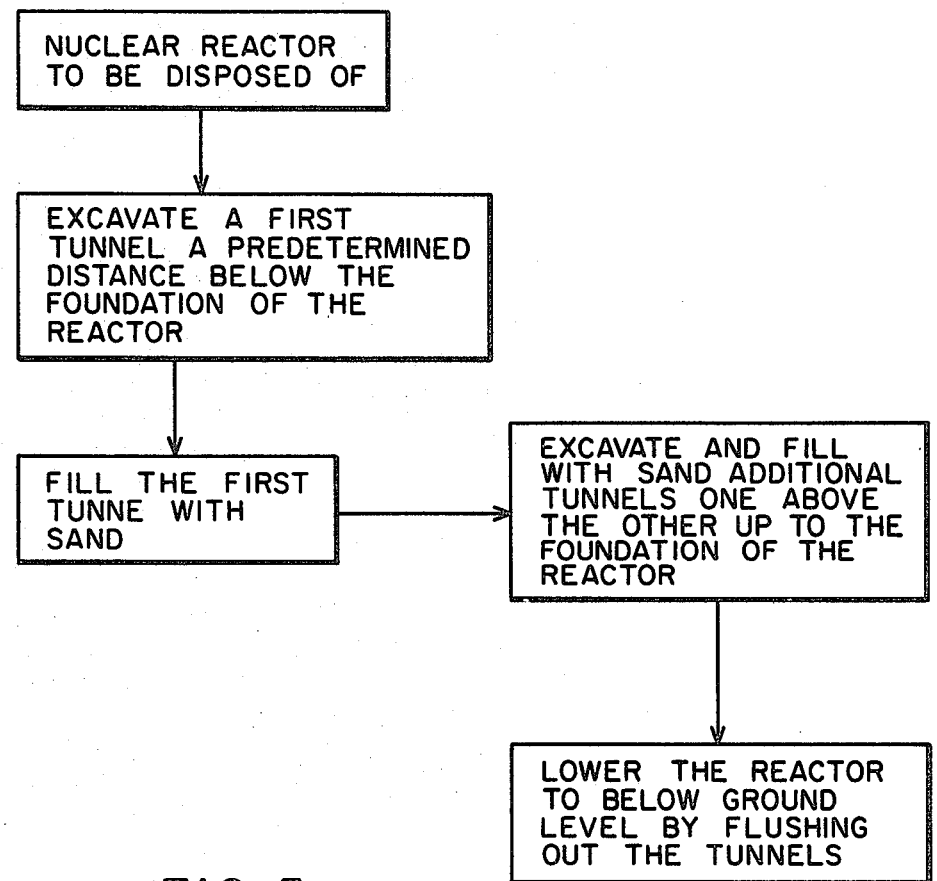
FIG. 5 is a block diagram illustrating yet another embodiment of the method of the present invention.

According to another embodiment of the method according to the invention and with reference to FIG. 5, a tunnel is driven along the lowermost stratum of the pit receiving the power plant part or reactor part and this is immediately filled with sand or another fluent filler that can be flushed out, tunnels are driven at consecutive levels up to beneath the foundations of the part to be sunk and are likewise filled, and the reactor or power plant part is subsequently lowered by flushing out the filler.

According to another embodiment of the invention, beneath the reactor part or power plant part that is to be sunk and that is carried by a base plate, a pit is excavated for receiving same and the part to be sunk is then separated from the plate and lowered into the pit. For the purpose of lowering into the pit, a supporting structure may be provided from which the supporting base plate of the separated power plant part or reactor part is suspended (FIG. 3).

The pit formed beneath the part to be lowered can also be filled with a medium which is flushed or sucked out to sink the power plant part or reactor part separated from the base plate.

What is claimed is:

1. A method of safely disposing of a nuclear reactor including a reactor building housing a reactor vessel that contains a sealing sleeve with a fuel element, said reactor resting on a foundation defined by the reactor building, said method comprising the steps of:

provolving the reactor with sealing and radiation protecting substances to encapsulate and seal the reactor during disposal;

separating the foundation of the reactor from the reactor building;

demolishing the reactor building by conventional means;

excavating the ground below the foundation of the nuclear reactor in superposed planes, said excavation continuing until the depth of excavation is sufficiently below ground level so that the nuclear reactor lowered into the excavation and covered by earth would be safely disposed of;

controllably lowering said nuclear reactor into said excavation to said sufficient depth; and covering said nuclear reactor and filling said excavation with earth to restore a new ground level whereby said nuclear reactor is safely disposed of and the ground level is available for general use.

* * * * *